United States Patent
Jiang et al.

(10) Patent No.: US 11,344,825 B2
(45) Date of Patent: May 31, 2022

(54) HIGH-EFFICIENCY FILTER PRESS

(71) Applicant: Jingjin Equipment Inc., Shandong (CN)

(72) Inventors: Guiting Jiang, Shandong (CN); Fengjiang Liu, Shandong (CN); Baochang Liu, Shandong (CN)

(73) Assignee: JINGJIN EQUIPMENT INC., Shandong (CN)

( * ) Notice: Subject to any disclaimer, the term of this patent is extended or adjusted under 35 U.S.C. 154(b) by 270 days.

(21) Appl. No.: 16/610,084

(22) PCT Filed: Sep. 23, 2019

(86) PCT No.: PCT/CN2019/107271
§ 371 (c)(1),
(2) Date: Nov. 1, 2019

(87) PCT Pub. No.: WO2021/051422
PCT Pub. Date: Mar. 25, 2021

(65) Prior Publication Data
US 2021/0354058 A1    Nov. 18, 2021

(30) Foreign Application Priority Data

Sep. 20, 2019 (CN) .......................... 201910894898.4

(51) Int. Cl.
*B01D 25/12* (2006.01)
*B01D 25/00* (2006.01)
(Continued)

(52) U.S. Cl.
CPC ........... *B01D 25/12* (2013.01); *B01D 25/003* (2013.01); *B01D 25/215* (2013.01); *B01D 25/28* (2013.01); *B01D 25/282* (2013.01); *B01D 25/305* (2013.01)

(58) Field of Classification Search
CPC ...... B01D 25/12; B01D 25/003; B01D 25/28; B01D 25/282; B01D 25/305; B01D 25/215
See application file for complete search history.

(56) References Cited

U.S. PATENT DOCUMENTS 3,760,945 A * 9/1973 Davis .................. B01D 25/285
                                              210/143
5,112,502 A * 5/1992 Satoh ..................... B01D 25/28
                                              210/770
(Continued)

FOREIGN PATENT DOCUMENTS

CN        2562838 Y      7/2003
CN     203436885 U      2/2014
(Continued)

OTHER PUBLICATIONS

The Russian 1st Office Action dated Jun. 3, 2020 for Application No. RU2019140273.
(Continued)

*Primary Examiner* — Liam Royce
(74) *Attorney, Agent, or Firm* — Yue (Robert) Xu; Apex Attorneys at Law, LLP

(57) ABSTRACT

A high-efficiency filter press includes a filter plate for solid-liquid separation, a material pool for storing materials and transporting the materials to the filter plate, and a filtrate pool for storing filtrate flowing out of the filter plate, wherein the filter plate is provided with a feed hole, a first drain hole and a second drain hole, the material pool is in communication with the feed hole through a feed pipe, the first drain hole is in communication with the filtrate pool through a first drain pipe, the second drain hole is in communication with the filtrate pool through a second drain pipe. The filter press further includes a washing device which is configured to inject washing water into the first
(Continued)

drain hole to allow the washing water to flow out from the second drain hole into the filtrate pool after flowing through the filter plate.

15 Claims, 1 Drawing Sheet

(51) Int. Cl.
  *B01D 25/28* (2006.01)
  *B01D 25/30* (2006.01)
  *B01D 25/21* (2006.01)

(56) References Cited

U.S. PATENT DOCUMENTS

| | | | |
|---|---|---|---|
| 6,180,002 | B1 | 1/2001 | Higgins |
| 2019/0151783 | A1* | 5/2019 | Holliday .............. B01D 25/302 |

FOREIGN PATENT DOCUMENTS

| | | |
|---|---|---|
| CN | 104258608 A | 1/2015 |
| CN | 109011746 A | 12/2018 |
| CN | 209033842 U | 6/2019 |
| FR | 2582538 A1 | 12/1986 |
| JP | H0731808 A | 2/1995 |
| RU | 15669 U1 | 11/2000 |
| RU | 2185875 C1 | 7/2002 |
| RU | 2255790 C2 | 7/2005 |
| RU | 102529 U1 | 3/2011 |
| SU | 1717176 A1 | 3/1992 |

OTHER PUBLICATIONS

International Search Report and Written Opinion of the International Searching Authority dated Jun. 19, 2020 for PCT/CN2019/107271.

* cited by examiner

HIGH-EFFICIENCY FILTER PRESS

The application is the national phase of International Application No. PCT/CN2019/107271, titled "HIGH-EFFICIENCY FILTER PRESS", filed on Sep. 23, 2019, which claims the priority to Chinese Patent Application No. 201910894898.4, titled "HIGH-EFFICIENCY FILTER PRESS", filed on Sep. 20, 2019 with the China National Intellectual Property Administration, the entire disclosures of the applications are incorporated herein by reference.

FIELD

The present application relates to the technical field of filtration equipment, in particular to a high-efficiency filter press.

BACKGROUND

A high-efficiency filter press is the main filtration equipment in the solid-liquid separation industry. When filtering, materials enter the filter chamber through a central feed hole of the filter plate, particles in the materials are intercepted by the filter cloth installed in the filter chamber to form a filter cake, and the filtrate is discharged from drain holes at four corners of the filter plate, thereby achieving the solid-liquid separation.

Due to the development of economy, types of materials to be filtered in the solid-liquid separation industry are gradually increasing. The filtering materials have higher and higher requirements on the filtering effect of the filter cake, and the filter cake is required to have a low moisture content. However, the material filtration and separation effect of the currently used high-efficiency filter press is not ideal, the filtration effect is poor and the purity of the filter cake is low, which cannot reach the material filtering effect required by the user and cannot meet the filtering requirements required by the user.

Therefore, how to solve the problem of low purity of the filter cake during the filtration process is an urgent problem to be solved by those skilled in the art.

SUMMARY

In view of this, an object of the present application is to provide a high-efficiency filter press which can effectively improve the purity of the filter cake and the recovery rate of the filtrate, to improve the filtering effect and meet the filtering requirements of the user.

In order to achieve the above objects, the following technical solutions are provided according to the present application.

A high-efficiency filter press includes a filter plate for solid-liquid separation, a material pool for storing materials and transporting the materials to the filter plate, and a filtrate pool for storing filtrate flowing out of the filter plate, wherein the filter plate is provided with a feed hole, a first drain hole and a second drain hole, the material pool is in communication with the feed hole through a feed pipe, the first drain hole is in communication with the filtrate pool through a first drain pipe, the second drain hole is in communication with the filtrate pool through a second drain pipe, the first drain pipe is provided with a drain switch for controlling opening and closing of the first drain pipe, and the feed pipe is provided with a feed switch for controlling opening and closing of the feed pipe. The filter press further includes a washing device which is configured to inject washing water into the first drain hole to allow the washing water to flow out from the second drain hole to the filtrate pool after flowing through the filter plate.

Preferably, the filter plate includes a first filter plate and a second filter plate which are in communication with each other and form an inverted U shape, the feed hole is provided at a top of a junction of the first filter plate and the second filter plate, the first drain hole is arranged at a lower left corner of the first filter plate, and the second drain hole is arranged at a lower right corner of the second filter plate.

Preferably, the washing device includes a washing pool for storing the washing water and a water pump for pumping the washing water from the washing pool into the first drain hole.

Preferably, the washing device includes a water reservoir, a bottom of the water reservoir is in communication with the first exhaust pipe through a washing pipe, and the washing pipe is provided with a washing switch for controlling opening and closing of the washing pipe.

Preferably, the filter press further includes an air drying device configured to inject an air flow into the first drain hole to blow the residual filtrate in the filter plate out from the second drain hole, and the air drying device is in communication with the first drain hole through a first air delivery pipe.

Preferably, the air drying device is in communication with the feed pipe through a second air delivery pipe, the second air delivery pipe is provided with a check valve, the air drying device is configured to blow residual materials in the feed pipe into the material pool, the first air delivery pipe is provided with a first air delivery switch for controlling opening and closing of the first air delivery pipe, and the second air delivery pipe is provided with a second air delivery switch for controlling opening and closing of the second air delivery pipe.

Preferably, the air drying device includes an air pump for pumping air into the first drain hole.

Preferably, the air pump is an electromagnetic pump, and the filter press further includes a controller which is in signal communication with the air pump and is configured to control the operation of the air pump.

Preferably, the drain switch, the feed switch, the first air delivery switch and the second air delivery switch are all electromagnetic switches, and the drain switch, the feed switch, the first air delivery switch and the second air delivery switch are in signal communication with the controller.

Preferably, the controller is a PLC.

The high-efficiency filter press provided by the present application provides the first drain hole and the second drain hole in the filter plate which are both in communication with the filtrate pool, and during the filtering process, the filtrate can be separately discharged from the first drain hole and the second drain hole into the filtrate pool to be collected, thereby achieving high-efficiency and rapid filtration. After the filtration is finished, since the washing device is in communication with the first drain hole, the washing water can be injected into the first drain hole to back flush the filter cake in the filter plate, and the first drain pipe in communication with the first drain hole is provided with the drain switch, and the feed pipe in communication with the feed hole is provided with the feed switch, thus after the feed switch and the drain switch are both switched off, the washing water entering from the first drain hole can be discharged only from the second drain hole into the filtrate pool after washing the filter cake, thereby realizing the back flushing of the filter cake. By the back flushing of the filter cake, the purity of the filter cake can be greatly improved, and the recovery rate of the filtrate can be improved as well, thereby greatly improving the filtering effect for the materials.

BRIEF DESCRIPTION OF THE DRAWINGS

For more clearly illustrating embodiments of the present application or the technical solutions in the conventional technology, drawings referred to describe the embodiments or the conventional technology will be briefly described hereinafter. The drawings in the following description are only embodiments of the present application, and for those skilled in the art, other drawings may be obtained based on the provided drawings without any creative efforts.

REFERENCE NUMERALS

| 1  | filter plate,              | 2  | feed hole,                   |
|----|----------------------------|----|------------------------------|
| 3  | feed pipe,                 | 4  | feed switch,                 |
| 5  | material pool,             | 6  | filtrate pool,               |
| 7  | second drain pipe,         | 8  | first drain pipe,            |
| 9  | drain switch,              | 10 | washing pool,                |
| 11 | washing switch,            | 12 | washing pipe,                |
| 13 | air drying device,         | 14 | second air delivery pipe,    |
| 15 | first air delivery pipe,   | 16 | second air delivery switch,  |
| 17 | first air delivery switch, | 18 | second drain hole,           |
| 19 | first drain hole,          | 20 | check valve,                 |
| 21 | back-blowing hole,         | 22 | first filter plate,          |
| 23 | second filter plate.       |    |                              |

DETAILED DESCRIPTION OF THE EMBODIMENTS

The technical solutions in the embodiments of the present application are clearly and completely described hereinafter in conjunction with drawings in the embodiments of the present application. It is apparent that embodiments described below are only some embodiments of the present application, rather than all of the embodiments. All other embodiments obtained according to the embodiments of the present application by those skilled in the art without any creative work fall within the scope of protection of the present application.

A core of the present application is to provide a high-efficiency filter press which can effectively improve the purity of the filter cake and the recovery rate of the filtrate to improve the filtering effect and meet the filtering requirements of the user.

Figure 1:
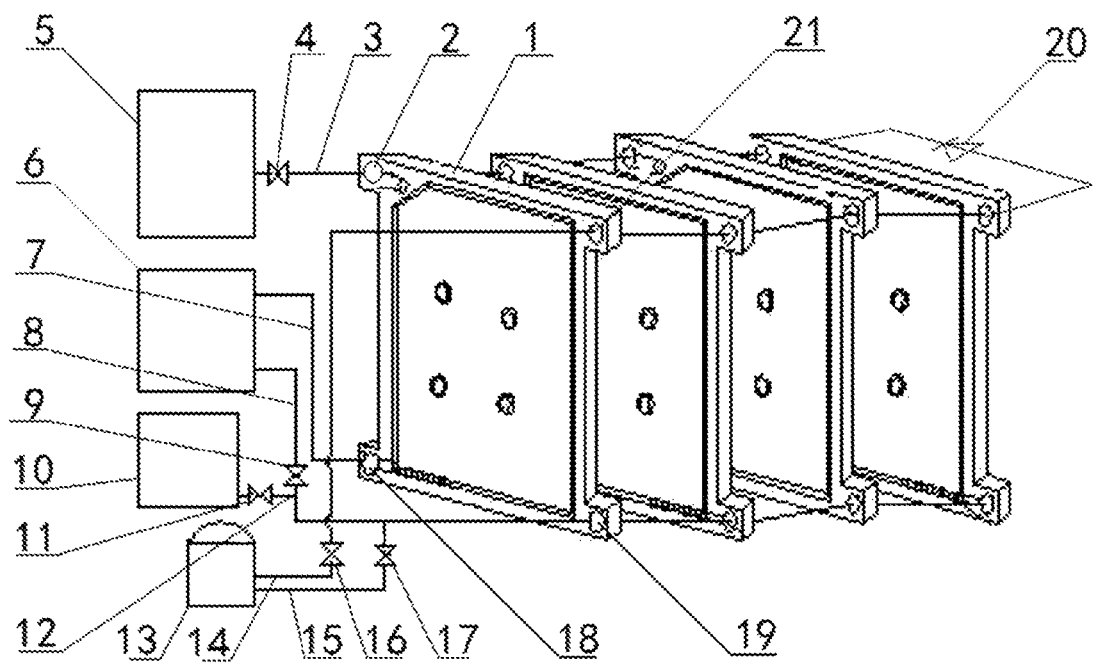
FIG. 1 is a schematic view of a specific embodiment of a high-efficiency filter press provided by the present application.
Figure 2:
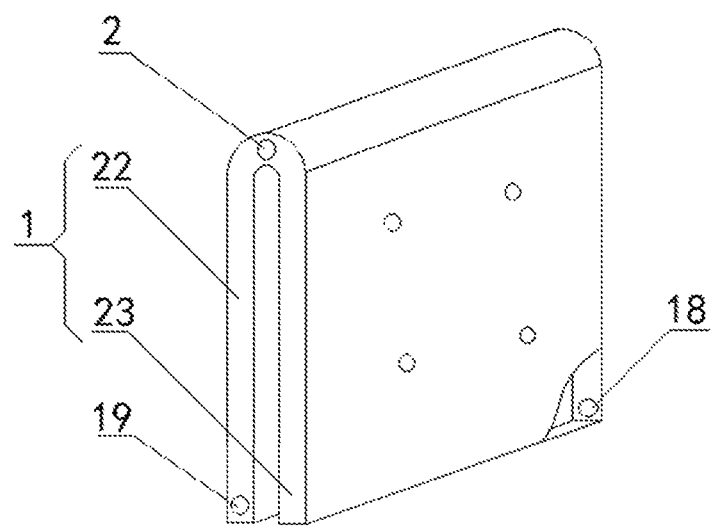
FIG. 2 is a schematic view of a specific embodiment of a filter plate provided by the present application.

Referring to FIG. 1 and FIG. 2, FIG. 1 is a schematic view of a specific embodiment of a high-efficiency filter press provided by the present application, and FIG. 2 is a schematic view of a specific embodiment of a filter plate provided by the present application.

The high-efficiency filter press according to the present application includes a filter plate 1 for solid-liquid separation, a material pool 5 for storing and transporting materials to the filter plate 1, and a filtrate pool 6 for storing filtrate flowing out of the filter plate 1. The filter plate 1 is provided with a feed hole 2, a first drain hole 19 and a second drain hole 18, the material pool 5 is in communication with the feed hole 2 through a feed pipe 3, the first drain hole 19 is in communication with the filtrate pool 6 through a first drain pipe 8, and the second drain hole 18 is in communication with the filtrate pool 6 through a second drain pipe 7. The first drain pipe 8 is provided with a drain switch 9 for controlling opening and closing of the first drain pipe 8, and the feed pipe 3 is provided with a feed switch 4 for controlling opening and closing of the feed pipe 3. The filter press further includes a washing device which is configured to inject washing water into the first drain hole 19, to allow the washing water to flow out from the second drain hole 18 into the filtrate pool 6 after flowing through the filter plate 1.

The filter plate 1 is used for solid-liquid separation. The filter plate 1 is provided with the feed hole 2 for feeding and the first drain hole 19 and the second drain hole 18 for discharging the filtrate. The filter plate 1 is provided with a filter chamber. When filtering, materials enter the filter chamber through the feed hole 2 of the filter plate 1, particles in the materials are intercepted by the filter cloth mounted in the filter chamber to form a filter cake, and the filtrate is discharged from the first drain hole 19 and the second drain hole 18 arranged on the filter plate 1, thereby achieving the solid-liquid separation.

The material pool 5 is used for storing materials to be filtered. The material pool 5 is in communication with the feed hole 2 in the filter plate 1 to transport the materials in the material pool 5 to the filter plate 1 for solid-liquid separation. The material pool 5 can be in communication with the feed hole 2 in the filter plate 1 through the feed pipe 3, and the feed switch 4 for controlling the opening and closing of the feed pipe 3 is arranged on the feed pipe 3. When the materials in the material pool 5 need to be transported into the filter plate 1 for filtration, the feed switch 4 can be turned on to allow the materials in the material pool 5 to flow into the filter plate 1. When the filtration needs to be stopped, it only needs to turn off the feed switch 4. The material pool 5 can be placed at a higher position with respect to the feed hole 2 in the filter plate 1, and an outlet of the material pool 5 can be placed at a bottom of the material pool 5, so that when the feed switch 4 on the feed pipe 3 is turned on, the materials can automatically flow into the filter plate 1 for filtration under the action of gravity. Obviously, a material pump may be used to pump the materials into the filter plate 1, which can be flexibly arranged according to actual conditions.

The filtrate pool 6 is configured to collect the filtrate flowing out of the first drain hole 19 and the second drain hole 18. The first drain hole 19 is in communication with the filtrate pool 6 through the first drain pipe 8, and the second drain hole 18 is in communication with the filtrate pool 6 through the second drain pipe 7. The first drain pipe 8 is provided with the drain switch 9 for controlling the opening and closing of the first drain pipe 8. The filtrate flowing out from the filter plate 1 can flow into the filtrate pool 6 through the first drain hole 19 and the second drain hole 18, to be collected.

The washing device is used for back flushing the filter cake which has been filtered and stored in the filter chamber. During the back flushing, the feed switch 4 on the feed pipe 3 is switched off, and the drain switch 9 on the first drain pipe 8 in communication with the first drain hole 19 is switched off, and then the washing water is injected into the first drain hole 19 by the washing device. After the washing water enters the filter plate 1, the washing water flows through the filter cake formed by the filtration in the filter plate 1 and washes the filter cake. Since the drain switch 9 on the first drain pipe 8 has been switched off, the washing water entering the filter plate 1 can only flow out from the second drain hole 18 into the filtrate pool 6 after washing the filter cake, thereby achieving collection of the washing water and completing the back flushing of the filter cake.

The high-efficiency filter press provided by the present application provides the first drain hole 19 and the second drain hole 18 in the filter plate 1 which are both in communication with the filtrate pool 6, and during the material filtering process, the filtrate can be separately discharged from the first drain hole 19 and the second drain hole 18 into the filtrate pool 6 to be collected, thereby achieving high-efficient and rapid filtration. After the filtration is finished, since the washing device is in communication with the first drain hole 19, the washing water can be injected into the first drain hole 19 to back flush the filter cake in the filter plate 1, and the first drain pipe 8 in communication with the first drain hole 19 is provided with the drain switch 9, and the feed pipe 3 in communication with the feed hole 2 is provided with the feed switch 4, thus after the feed switch 4 and the drain switch 9 are both switched off, the washing water entering from the first drain hole 19 can only be discharged from the second drain hole 18 into the filtrate pool 6 after washing the filter cake, thereby realizing the back flushing of the filter cake. By the back flushing of the filter cake, the purity of the filter cake can be greatly improved, and the recovery rate of the filtrate can be improved as well, thereby greatly improving the filtering effect for the materials.

On the basis of the above embodiments, in consideration of the specific structure arrangement of the filter plate 1, preferably, the filter plate 1 may include a first filter plate 22 and a second filter plate 23 which are in communication with each other. The first filter plate 22 and the second filter plate 23 are communication with each other and together form an inverted U shape, and the feed hole 2 is arranged at a top of the inverted U-shaped filter plate 1. Single-chamber feeding has the advantage of pressure equalization during the process of feeding the materials into the filter chamber. The first drain hole 19 is arranged at a lower left corner of the first filter plate 22, and the second drain hole 18 is arranged at a lower right corner of the second filter plate 23. By providing these two drain holes, the filtrate can be discharged more quickly and the moisture content of the filter cake can be reduced.

When filtering, the materials can enter the filter plate 1 from the feed hole 2 arranged at the top of the inverted U-shaped filter plate 1, and then flow from the top of the filter plate 1 to the first filter plate 22 and the second filter plate 23 respectively, and the solid-liquid separation of the materials is completed in the first filter plate 22 and the second filter plate 23. The filtrate in the first filter plate 22 is discharged from the first drain hole 19 arranged at the lower left corner of the first filter plate 22 into the filtrate pool 6, and the filtrate in the second filter plate 23 is discharged from the second drain hole 18 arranged at the lower right corner of the second filter plate 23 into the filtrate pool 6.

During the back flushing, the feed switch 4 and the drain switch 9 are both switched off, and the washing device injects the washing water into the first drain hole 19. Since the first drain hole 19 is arranged at the lower left corner of the first filter plate 22, the washing water injected into the first filter plate 22 needs to flow upward from the bottom of the first filter plate 22, and after the washing water flows through the filter cake in the first filter plate 22 and back flushes the filter cake, the washing water continues to flow upward to a junction of the filter plate 22 and the second filter plate 23, and then flows downward into the second filter plate 23, to wash the filter cake in the second filter plate 23, and then the washing water flows out from the second drain hole 18 at the lower right corner of the second filter plate 23 into the filtrate pool 6, thereby completing the washing of the filter cakes in the first filter plate 22 and the second filter plate 23.

It should be noted that the above lower left corner and the lower right corner refer to the lower left corner and the lower right corner viewed from the same side of the filter plate 1, that is, the first drain hole 19 and the second drain hole 18 are located at two sides of the filter plate. Since the first drain hole 19 is arranged at the lower left corner of the first filter plate 22, and the second drain hole 18 is arranged at the lower right corner of the second filter plate 23, the washing water has to completely penetrate the filter plate 1 before flowing out, thereby greatly improving the washing effect of the washing water for the filter cake and further improving the purity of the filter cake.

On the basis of the above embodiments, in consideration of the specific structural arrangement of the washing device, preferably, the washing device may include a washing pool 10 for storing the washing water and a water pump for pumping the washing water from the washing pool 10 into the first drain hole 19. When back flushing is required, the water pump can be turned on, and the washing water can be pumped into the first drain hole 19 for back flushing.

The washing device may also have other structures. For example, the washing device includes a water reservoir, a bottom of the water reservoir is in communication with a first exhaust pipe through a washing pipe 12, and the washing pipe 12 is provided with a washing switch 11 for controlling opening and closing of the washing pipe 12. During the back flushing, the washing switch 11 can be turned on, and since the washing switch 11 is arranged at the bottom of the water reservoir, the water in the water reservoir can flow out of the water reservoir into the first drain hole 19 under the action of the gravity to wash the filter cake. Obviously, the water reservoir should be placed higher than the filter plate 1 to ensure that the washing water can completely penetrate the filter plate 1.

Based on any one of the above embodiments, the filter press further includes an air drying device 13 configured to inject an air flow into the first drain hole 19 to blow the residual filtrate in the filter plate 1 out from the second drain hole 18, and the air drying device 13 is in communication with the first drain hole 19 through a first air delivery pipe 15.

Considering that there are still some filtrate remaining on the filter cake after the back flushing of the filter cake, the air drying device 13 can be connected to the first drain hole 19, so as to further improve the filtering effect of the high-efficiency filter press provided by the present application. The air drying device 13 is configured to inject the air flow into the first drain hole 19, and the air drying device 13 is in communication with the first drain hole 19 through the first air delivery pipe 15. After the washing device completes the back flushing, the air drying device 13 can be started to inject the air flow into the first drain hole 19. At this time, the feed switch 4 and the drain switch 9 are both switched off. Therefore, the air flow entering the filter plate 1 from the first drain hole 19 dries the filter cake in the filter plate 1, and the air flow flowing through the filter cake flows out through the second drain hole 18.

After the back flushing, the filter cake is air-dried again after washing, which can blow-dry the residual moisture after the back flushing, so that the liquid content of the filter cake is greatly reduced, thereby further improving the filtering effect.

On the basis of the above embodiments, the air drying device 13 can communicate with the feed pipe 3 through a second air delivery pipe 14. The second air delivery pipe 14 is provided with a check valve 20. The air drying device 13 is configured to blow residual materials in the feed pipe 3 into the material pool 5. The first air delivery pipe 15 is provided with a first air delivery switch 17 for controlling opening and closing of the first air delivery pipe 15, and the second air delivery pipe 14 is provided with a second air delivery switch 16 for controlling opening and closing of the second air delivery pipe 14.

Considering that there are still some materials left in the feed pipe 3 arranged between the material pool 5 and the feed hole 2 after the material filtration is completed, the air drying device 13 may further communicate with the feed pipe 3 through the second air delivery pipe 14, the second air delivery switch 16 for controlling opening and closing of the second air delivery pipe 14 is provided on the second air delivery pipe 14, and the first air delivery switch 17 for controlling opening and closing of the first air delivery pipe 15 is provided on the first air delivery pipe 15, so as to prevent the residual materials in the feed pipe 3 from flowing into the filter plate 1 and affecting the filtration effect and to further improve the filtering effect of the high-efficiency filter press provided by the present application.

After the filter plate 1 completes the filtering of the materials, the first air delivery switch 17 on the first air delivery pipe 15 is switched off, the second air delivery switch 16 on the second air supply pipe 14 is switched on, and the air drying device 13 is started to inject an air flow into the second air delivery pipe 14. The air flow enters the feed pipe 3 from the second air delivery pipe 14, and blows the residual materials in the feed pipe 3 into the material pool 5, to prevent the residual materials in the feed pipe 3 from flowing into the filter cake that has been filtered and affecting the filtering effect. Therefore, the filtering effect of the high-efficiency filter press provided by the present application is further guaranteed.

In order to avoid excessive materials entering the second air delivery pipe 14 during the process of the material pool 5 transporting the materials into the feed hole 2, the check valve 20 may be arranged on the second air delivery pipe 14 at a place close to the feed hole 2, thereby ensuring that the air flow blown from the air drying device 13 can flow into the feed pipe 3 while the materials in the feed pipe 3 cannot enter the second air delivery pipe 14.

On the basis of the above embodiments, in consideration of the specific structural selection of the air drying device 13, preferably, the air drying device 13 includes an air pump for pumping air into the first drain hole 19. When it is required to blow air to the filter cake or the feed pipe 3, the air pump can be started to pump air into the first air delivery pipe 15 or the second air delivery pipe 14.

Of course, the air drying device 13 may also be of other structures, such as an air storage tank. High pressure air is stored in the air storage tank, and when necessary, the air storage tank is opened to inject air into the first air delivery pipe 15 or the second air delivery pipe 14.

On the basis of the above embodiments, in order to further improve the convenience and intelligence of the operation of the high-efficiency filter press provided by the present application, it is preferable to set both the water pump and the air pump as electromagnetic pumps, and both the water pump and the air pump are in signal communication with a controller configured to control their operations, such that the controller can be used to control the opening and closing of the water pump and the air pump, and to control the magnitude of the pressure of the water pump and the air pump as needed.

On the basis of the above embodiments, in order to further improve the intelligence of the operation of the high-efficiency filter press provided by the present application, the drain switch 9, the feed switch 4, the washing switch 11, the first air delivery pipe 15 and the second air delivery pipe 14 are all configured as electromagnetic switches, and the drain switch 9, the feed switch 4, the washing switch 11, the first air delivery switch 17, and the second air delivery switch 16 are in signal communication with the controller, so that the on and off of the switches can be controlled by the controller.

Preferably, the controller may be a PLC, and cooperation processes among the various devices of the high-efficiency filter press provided by the present application can be controlled by the PLC. For example, the filtering process may be performed in the following order:

Starting State: all switches and devices are off;

Solid-Liquid Separation of the Materials: the controller controls to turn on the feed switch 4 and the drain switch 9, so that the material pool 5 transports the materials into the filter plate 1 for solid-liquid separation, the materials enter the filter plate 1 from the feed hole 2, and the filtrate is discharged from the first drain hole 19 and the second drain hole 18 into the filtrate pool 6;

Back Blowing the Feed Pipe 3: the controller controls to turn on the second air delivery switch 16 and start the air pump to pump the air flow into the feed pipe 3 to blow the residual materials in the feed pipe 3 into the material pool 5, and then controls to shut down the air pump and turn off the second air delivery switch 16;

Back Flushing: the controller controls to turn off the feed switch 4 and the drain switch 9, and controls to turn on the washing switch 11, and controls the water pump to pump the washing water into the first drain hole 19 for back flushing, and then controls to shut down the water pump and turn off the washing switch 11 after the washing is completed; and Back Air Drying: the controller controls to turn on the first air delivery switch 17, and controls the air pump to pump the air flow into the first drain hole 19 to blow-dry the moisture remaining in the filter plate 1 after the back flushing.

In a case that many filter plates 1 are provided, back-blowing holes 21 for allowing the second air delivery pipe 14 to pass through may be provided at right upper corners of the filter plates 1 in order to prevent the second air delivery pipe 14 from occupying too much space, so that the second air delivery pipe 14 can be supported in the back-blowing holes 21 by passing along the back-blowing holes 21 at the upper right corners of the filter plate 1, thereby fixedly supporting the second air delivery pipe 14 and improving the utilization of the space. In addition, the filter plate 1 may be configured as an external hanging type to increase the effective filtration area of the filter chamber.

In the present specification, the embodiments are described in a progressive manner. Each embodiment mainly focuses on an aspect different from other embodiments, and reference can be made to these similar parts among the embodiments.

The high-efficiency filter press provided by the present application has been described in detail above. The principle and embodiments of the present application have been illustrated herein with reference to specific examples, and the description of the above embodiments is only intended to facilitate understanding the method and core idea of the present application. It should be noted that, for those skilled in the art, various improvements and modifications may be made to the present application without departing from the principle of the present application, and these modifications and improvements are also deemed to fall into the scope of protection of the present application defined by the claims.

The invention claimed is:

1. A high-efficiency filter press, comprising a filter plate for solid-liquid separation, a material reservoir configured to store materials and transport the materials into the filter plate, and a filtrate reservoir configured to store filtrate flowing out of the filter plate, wherein,
the filter plate is provided with a feed hole, a first drain hole and a second drain hole, the material reservoir is in communication with the feed hole through a feed pipe, the first drain hole is in communication with the filtrate reservoir through a first drain pipe, the second drain hole is in communication with the filtrate reservoir through a second drain pipe, the first drain pipe is provided with a drain valve configured to control opening and closing of the first drain pipe, the feed pipe is provided with a feed valve configured to control opening and closing of the feed pipe, and the high-efficiency filter press further comprises a washing device configured to inject washing water into the first drain hole to allow the washing water to flow out from the second drain hole into the filtrate reservoir after flowing through the filter plate,
wherein the filter plate comprises a first filter plate and a second filter plate which are in communication with each other and form an inverted U shape, the feed hole is provided at a top of a junction of the first filter plate and the second filter plate, the first drain hole is arranged at a lower left corner of the first filter plate, and the second drain hole is arranged at a lower right corner of the second filter plate.

2. The high-efficiency filter press according to claim 1, wherein the washing device comprises a water reservoir configured to store the washing water and a water pump configured to pump the washing water from the washing reservoir into the first drain hole.

3. The high-efficiency filter press according to claim 1, wherein the washing device comprises a water reservoir, a bottom of the water reservoir is in communication with the first drain pipe through a washing pipe, and the washing pipe is provided with a washing valve configured to control opening and closing of the washing pipe.

4. The high-efficiency filter press according to claim 1, wherein the high-efficiency filter press further comprises an air drying device configured to inject an air flow into the first drain hole to blow residual filtrate in the filter plate out from the second drain hole, and the air drying device is in communication with the first drain hole through a first air delivery pipe.

5. The high-efficiency filter press according to claim 4, wherein the air drying device is in communication with the feed pipe through a second air delivery pipe, the second air delivery pipe is provided with a check valve, the air drying device is configured to blow residual materials in the feed pipe into the material reservoir, the first air delivery pipe is provided with a first air delivery valve configured to control opening and closing of the first air delivery pipe, and the second air delivery pipe is provided with a second air delivery valve configured to control opening and closing of the second air delivery pipe.

6. The high-efficiency filter press according to claim 5, wherein the air drying device comprises an air pump configured to pump air into the first drain hole.

7. The high-efficiency filter press according to claim 6, wherein the air pump is an electromagnetic pump, and the high-efficiency filter press further comprises a controller which is in signal communication with the air pump and is configured to control operation of the air pump.

8. The high-efficiency filter press according to claim 7, wherein the drain valve, the feed valve, the first air delivery valve and the second air delivery valve are all electromagnetic valves, and the drain valve, the feed valve, the first air delivery valve and the second air delivery valve are all in signal communication with the controller.

9. The high-efficiency filter press according to claim 8, wherein the controller is a programmable logic controller (PLC).

10. The high-efficiency filter press according to claim 2, wherein the high-efficiency filter press further comprises an air drying device configured to inject an air flow into the first drain hole to blow residual filtrate in the filter plate out from the second drain hole, and the air drying device is in communication with the first drain hole through a first air delivery pipe.

11. The high-efficiency filter press according to claim 10, wherein the air drying device is in communication with the feed pipe through a second air delivery pipe, the second air delivery pipe is provided with a check valve, the air drying device is configured to blow residual materials in the feed pipe into the material reservoir, the first air delivery pipe is provided with a first air delivery valve configured to control opening and closing of the first air delivery pipe, and the second air delivery pipe is provided with a second air delivery valve configured to control opening and closing of the second air delivery pipe.

12. The high-efficiency filter press according to claim 11, wherein the air drying device comprises an air pump configured to pump air into the first drain hole.

13. The high-efficiency filter press according to claim 3, wherein the high-efficiency filter press further comprises an air drying device configured to inject an air flow into the first drain hole to blow residual filtrate in the filter plate out from the second drain hole, and the air drying device is in communication with the first drain hole through a first air delivery pipe.

14. The high-efficiency filter press according to claim 13, wherein the air drying device is in communication with the feed pipe through a second air delivery pipe, the second air delivery pipe is provided with a check valve, the air drying device is configured to blow residual materials in the feed pipe into the material reservoir, the first air delivery pipe is provided with a first air delivery valve configured to control opening and closing of the first air delivery pipe, and the second air delivery pipe is provided with a second air delivery valve configured to control opening and closing of the second air delivery pipe.

15. The high-efficiency filter press according to claim 14, wherein the air drying device comprises an air pump configured to pump air into the first drain hole.

* * * * *